(12) United States Patent
Pritchard

(10) Patent No.: US 8,684,646 B2
(45) Date of Patent: Apr. 1, 2014

(54) THREAD FORMING FASTENER

(75) Inventor: Alan Pritchard, Almeria (ES)

(73) Assignee: Research Engineering & Manufacturing Inc., Middletown, RI (US)

( * ) Notice: Subject to any disclaimer, the term of this patent is extended or adjusted under 35 U.S.C. 154(b) by 1332 days.

(21) Appl. No.: 12/189,878

(22) Filed: Aug. 12, 2008

(65) Prior Publication Data

US 2009/0047095 A1    Feb. 19, 2009

Related U.S. Application Data

(60) Provisional application No. 60/955,482, filed on Aug. 13, 2007.

(51) Int. Cl.
*F16B 33/02* (2006.01)
*F16B 25/00* (2006.01)

(52) U.S. Cl.
USPC .......................................... 411/411; 411/387.4

(58) Field of Classification Search
USPC ................... 411/387.4, 411, DIG. 1, 414
See application file for complete search history.

(56) References Cited

U.S. PATENT DOCUMENTS

| | | | |
|---|---|---|---|
| 4,576,534 A | | 3/1986 | Barth et al. |
| 4,693,654 A | * | 9/1987 | Bettini .................. 411/387.4 |
| 4,756,653 A | | 7/1988 | Berger |
| 4,915,559 A | | 4/1990 | Wheeler et al. |
| 5,061,135 A | * | 10/1991 | Pritchard ..................... 411/411 |
| 5,470,334 A | * | 11/1995 | Ross et al. .................... 606/916 |
| 5,544,993 A | * | 8/1996 | Harle ............................ 411/414 |
| 5,704,750 A | * | 1/1998 | Bartos et al. ................. 411/411 |
| 5,722,808 A | * | 3/1998 | Pritchard ................... 411/366.3 |
| 5,735,658 A | * | 4/1998 | Harle ............................ 411/414 |
| 5,800,107 A | * | 9/1998 | Giannuzzi et al. ............ 411/386 |

(Continued)

FOREIGN PATENT DOCUMENTS

| | | |
|---|---|---|
| CN | 276/1902 Y | 3/2006 |
| EP | 1 522 746 | 4/2005 |
| EP | 1 715 198 B1 | 2/2008 |
| FR | 2 645 922 | 10/1990 |

*Primary Examiner* — Victor Batson
*Assistant Examiner* — Tyler Johnson
(74) *Attorney, Agent, or Firm* — Cesari and McKenna, LLP

(57) ABSTRACT

A thread forming fastener for threading into a nut anchor of a pliable material wherein there is produced during the driving of the fastener a combination of forces that encourages the nut anchor material to flow smoothly and to develop a mating thread in the nut anchor that minimizes stress cracking and radial hoop stress as the mating thread is being formed. The fastener comprises a drive head and a shank extending from the head and having a longitudinal axis, the shank including a core and a thread having a selected axial pitch, a selected thread height and a profile which in axial cross-section includes a leading face, a trailing face and a tip. The leading face is composed of a radially inner concave portion having a first radius and which transitions smoothly to a radially outer convex portion having a second radius, the transition occurring at a point on the common tangent to those portions. The trailing face is composed of a radially inner linear portion which transitions at a selected transition location to a radially outer convex portion having a third radius. The profile also includes a convex blending portion having a fourth radius which blends together the radially outer leading and trailing face portions at the tip. The thread profile produces force vectors during assembly with the nut anchor that provide enhanced mating thread strength and improved resistance to nut anchor thread breakdown.

15 Claims, 4 Drawing Sheets

(56) References Cited

U.S. PATENT DOCUMENTS

| | | | |
|---|---|---|---|
| 6,494,655 B1 * | 12/2002 | Pritchard | 411/399 |
| 6,672,813 B1 * | 1/2004 | Kajita et al. | 411/411 |
| 7,416,374 B2 * | 8/2008 | Breihan et al. | 411/411 |
| 2005/0244249 A1 | 11/2005 | Sussenbach | |
| 2006/0140741 A1 * | 6/2006 | Lin | 411/411 |
| 2006/0263171 A1 * | 11/2006 | Schwarz | 411/411 |
| 2010/0196121 A1 * | 8/2010 | Karupaya | 411/402 |

* cited by examiner

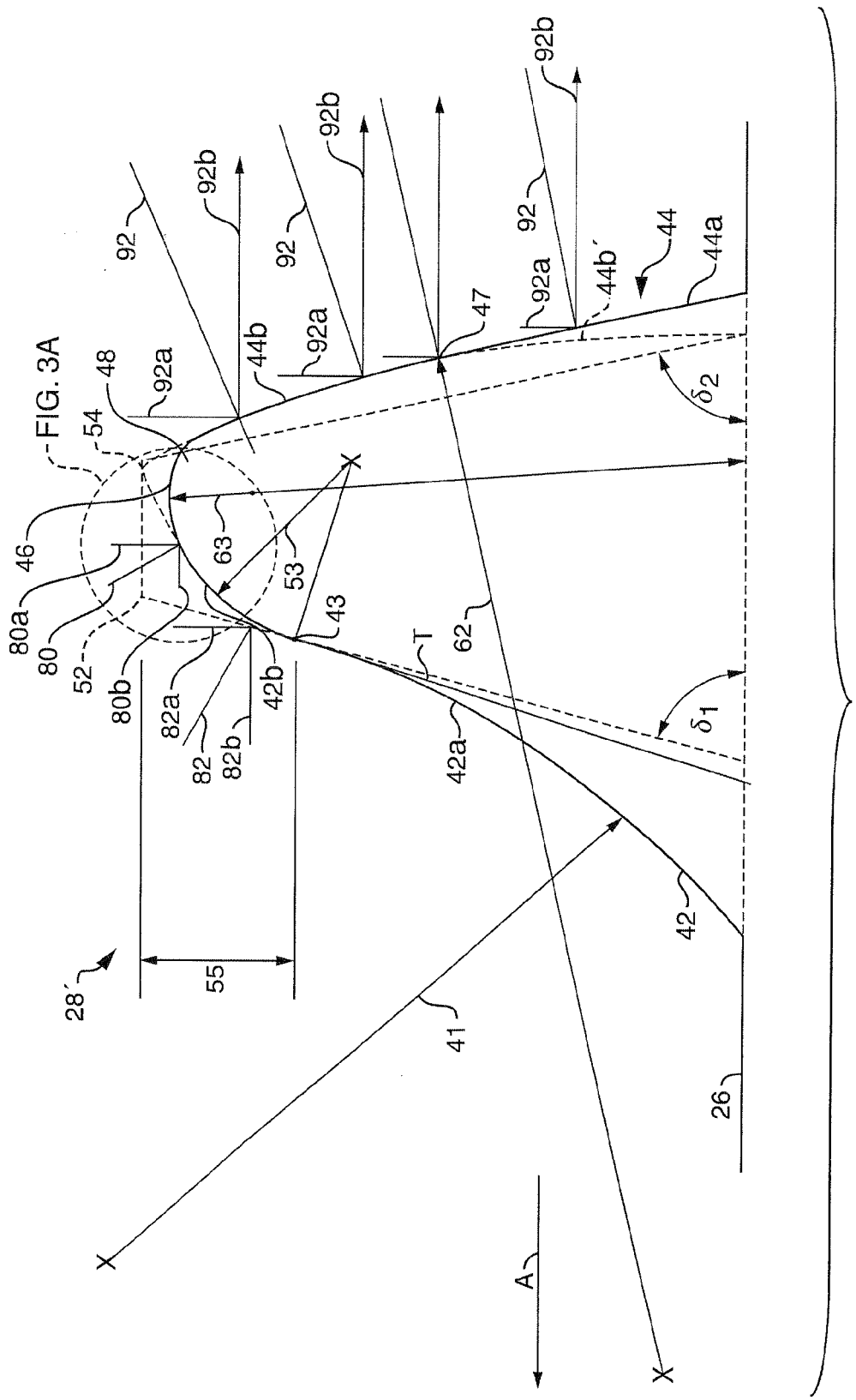

THREAD FORMING FASTENER

RELATED APPLICATION

This application claims the benefit of Provisional Application No. 60/955,482, filed Aug. 13, 2007.

BACKGROUND OF THE INVENTION

1. Field of the Invention

This invention relates to a thread forming fastener. It relates especially to a self-tapping screw that is particularly adapted for use with a nut anchor of a pliable material. By the term "nut anchor" is meant any separate nut or any anchor or support to which the fastener may be secured.

2. Background Information

It is generally recognized that self-tapping fasteners that screw into pliable materials such as plastics, soft metals, alloys, etc. need to address several basic requirements, namely:

during assembly, they should develop a low thread tapping torque when forming the mating thread in the associated nut or support structure, upon tightening, the fasteners should be capable of maintaining a relatively high resistance to thread stripping torque, the assembly of the fasteners and nut anchors should be capable of maintaining joint integrity under externally applied forces, and the fasteners should be able to maintain a reasonable resistance to joint loosening that can be caused by plastic flow or creep of the pliable material comprising the nut anchors into which the fasteners are screwed.

Many such fasteners used today have thread designs of a triangular cross-sectional geometry that are either symmetrical about a line that is perpendicular to the screw axis, are constructed to be asymmetrical to this same perpendicular or are constructed as stacked trapezoidal shapes. There also exist asymmetrical thread profiles that depart from the aforesaid triangular or trapezoidal forms, and develop forces within a nut anchor material that create and encourage anchor material flow in a manner that increases thread flank material contact along the mating trailing faces of the screw thread profile; see my U.S. Pat. No. 5,061,135.

As shown in FIG. 1, the aforesaid patented fastener has a shank shown generally at 2 comprised of a cylindrical core 3 and a thread 4 generated on a helical form around core 3, the thread having pitch 4'. The trailing face 5 of the screw 4 profile lies at an angle $\alpha$, preferably 10°-15°, to the thread diameter which diameter is perpendicular to the longitudinal axis of core 3. The thread profile also has a leading face 6 with a curved portion 6a extending from core 3 to a point 7 on the leading face where it transitions to a linear portion 6b with that portion lying at an angle $\beta$ relative to said diameter of 17° to 25° and extending to a tip 8. The vertical distance from point 7 to tip 8 is in the range of 23-27% of the thread height 9. Also, the magnitude of the radius 10 of the curved portion 6a is 0.22 to 0.30 times the nominal screw diameter or size.

A fastener having the aforesaid screw thread geometry creates improved performance conditions by generating material flow of the nut anchor material. However, that material flow is not as smooth as might be desired and that prior screw still has some potential for causing stress cracking of the nut anchor material during insertion of the fastener.

SUMMARY OF THE INVENTION

Accordingly, it is an object of this invention to provide a threaded fastener having a thread profile design which when used in a pliable nut anchor material provides improved assembly or tapping torque and especially high resistance to thread stripping or failure torque.

Another object of the invention is to provide a fastener of this type which, when assembled to a nut anchor, provides improved assembly load distribution at the mating thread profiles of the fastener and nut anchor.

Still another object of the invention is to provide such a fastener which creates a smooth nut anchor material flow during the generation of the nut anchor thread and avoids pronounced induced force directional changes within the nut anchor material.

A further object of the invention is to provide a fastener of this type which minimizes the potential for stress cracking in the nut anchor material as the fastener is tapping that anchor.

Other objects will, in part, be obvious and will, in part, appear hereinafter. The invention accordingly comprises the features of construction, combination of elements and arrangement of parts which will be exemplified in the following detailed description, and the scope of the invention will be indicated in the claims.

In general, my fastener comprises a shank composed of a generally cylindrical core with a longitudinal axis and a helical thread extending along and around the core. The fastener also includes a driver head at one end of the shank. The thread has a profile that is developed around defined radii that create variable force vectors during the assembly of the fastener or screw to a nut anchor. This thread profile enhances the mating thread strength and improves resistance to nut anchor thread breakdown within the assembly.

The thread profile in axial cross-section is composed of a plurality of zones. More particularly, there is a first zone comprising a concave leading face portion that extends from the core to a location that is in the order of 22-27% of the screw thread depth. In this, it is similar to the portion or zone 6a of my prior patented fastener depicted in FIG. 1. In the present fastener, however, the concave leading face portion transitions smoothly at a common tangent to a second zone that is of a convex construction such that the thread profile tip along the leading face reduces in magnitude toward the fastener lead entry portion, i.e. the screw tip.

The thread profile also includes a third zone at its trailing face, extending from the core to a point that lies about half the depth of the thread profile. At that point, the trailing face transitions to a fourth zone which is constructed as a convex portion along the outer half of the thread profile. A fifth and final zone is constructed as a convex radius which blends together the leading and trailing face convex radii at the tip of the thread.

As we shall see, the aforesaid combination of radii in the various thread profile zones or portions enhances the ability of the pliable nut anchor material to flow smoothly as the fastener is threaded into the anchor and also improves the overall performance of an assembly comprising my self-tapping screw or fastener in combination with a nut anchor of a pliable material such as a plastic or a light metal or metal alloy.

BRIEF DESCRIPTION OF THE DRAWINGS

For a fuller understanding of the nature and objects of the invention, reference should be made to the following detailed description taken in connection with the accompanying drawings, of which:

FIGS. 3 and 3A are diagrammatic illustrations, on a much larger scale, of the thread profile of the FIG. 2 fastener.

DESCRIPTION OF PREFERRED EMBODIMENTS

Figure 2:
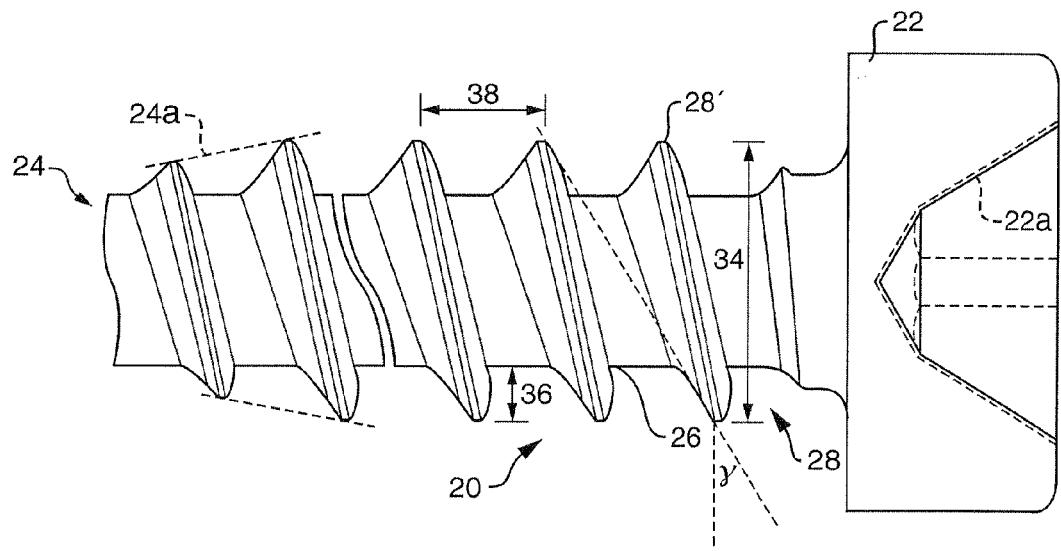
FIG. 2 is a fragmentary side elevational view on a smaller scale of a thread forming fastener embodying the invention.
Figure 4:
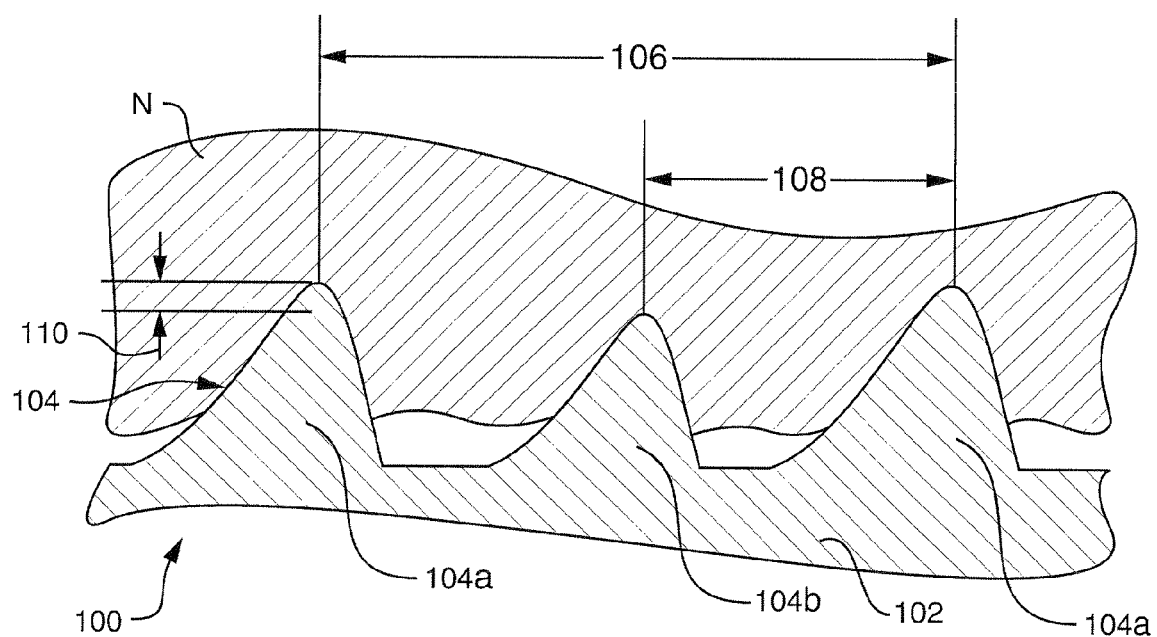
FIG. 4 is a view similar to FIG. 1 of the thread profile of a two lead screw thread incorporating the invention.

Referring to FIG. 2, shown there is a thread forming fastener 20 incorporating the invention. Fastener 20 includes a driver head 22 and a shank indicated generally at 24 extending from the head and adapted to be threaded into a nut anchor N (FIG. 4). The head may be of any desired type or configuration and may contain a recess 22a as shown, or a projection, that facilitates rotation of the fastener. Also, while the illustrated shank 24 has a generally circular cross-section, it could also have a trilobal cross-sectional form of the type described in U.S. Pat. No. 3,195,156. Preferably, a free end segment of shank 24 is tapered as indicated at 24a to facilitate insertion of the fastener into the nut anchor.

Shank 24 includes a core 26 and a non-symmetrical thread 28 generated on a helical form around core 26. This thread, which has an axial cross-sectional profile 28', may extend the entire length of the core or along a portion thereof. The magnitude of the helix or spiral angle γ of the thread is determined by direct relationships between the outer diameter or dimension 34 of the screw thread, the thread height 36 and the screw thread pitch 38.

It is preferred that the thread outside diameter 34 should fall within the range of 1-10 mm. For practical considerations, it is considered that fastener 20 has a nominal diameter size that is directly related to a standard self-tapping screw type. However, it should be understood that the invention is not limited to fasteners of any particular diameter or nominal size. The fastener 20 has a single start thread 28. As we shall see in connection with FIG. 4, however, the present invention is equally applicable to a fastener with a two start thread.

Refer now to FIG. 3, which shows the thread profile 28' in greater detail. As seen from this figure, the thread profile 28' has a leading face indicated generally at 42 composed of a first, radially inner, concave zone or portion 42a which may be similar to portion 6a in FIG. 1. That is, it has a radius 41 in the range of 0.22 to 0.30 times the screw diameter 34 (FIG. 2) as described in the above patent. Portion 42a extends from core 24 to a point 43 where the leading face transitions to a second, radially outer, zone or portion 42b which is convex, the transition occurring at a tangent line T common to the two portions. The thread profile 28' also has a trailing face shown generally at 44 consisting of a third, radially inner zone or portion 44a which is straight and extends from core 24 to a transition location 47, which is located about halfway along the thread height 36 (FIG. 2). At location 47, the trailing face 44 transitions to a fourth, radially outer, zone or portion 44b, which has a convex radius and extends almost to the thread profile tip 48. The thread profile 28' is completed by a fifth, tip, zone or portion 46, which is constructed with a radius 63 that blends together the convex radii of the leading and trailing face portions 42b and 44b adjacent to the thread profile tip 48.

Figure 1:
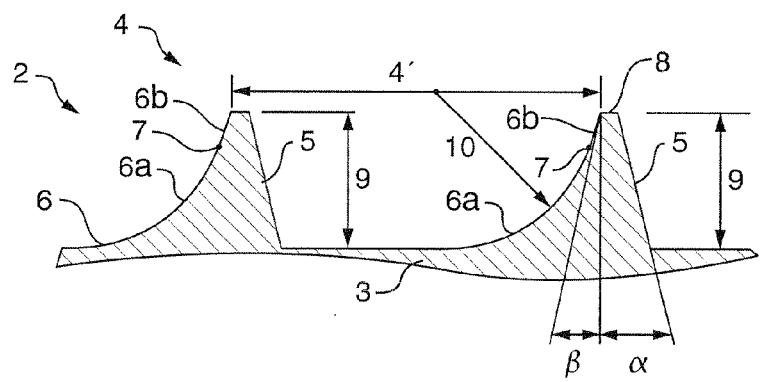
FIG. 1, already described, is a fragmentary sectional view of the thread profile of a prior thread-forming fastener.

Thus, it is apparent that the thread profile 28' of the present fastener differs from the prior profile depicted in FIG. 1 in that there is a combination of three different convex radii adjacent to the tip of the profile.

Figure 3A:
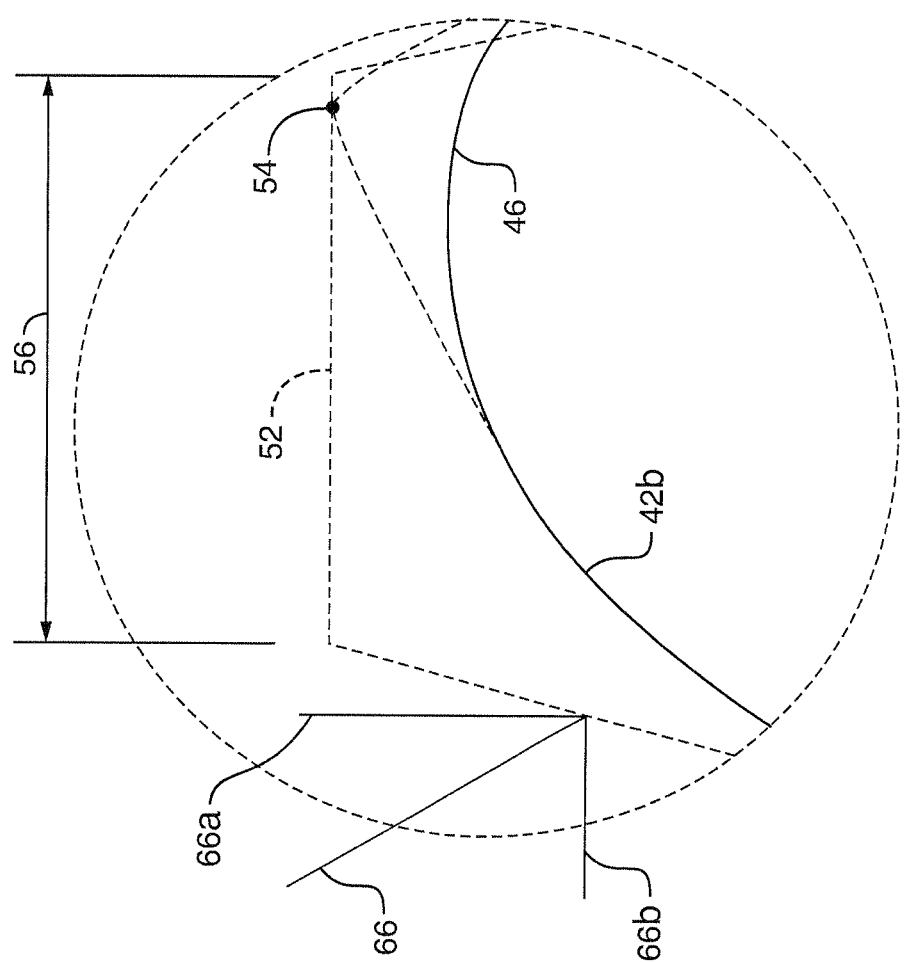

Referring to FIGS. 3 and 3A, to establish a base from which the present thread profile 28' is designed, we have shown that profile superimposed on a typical asymmetrical thread profile shown in phantom at 52. The leading face portion 42b of the profile has a radius 53 which is constructed from the relative positions of point 43 and a point 54 on profile 52. Point 43 is at a distance 55 from the outer periphery or tip of the thread profile 52. That distance is in the range of 22-27%, preferably 25%, of the screw thread height 36 (FIG. 2). As shown in FIG. 3A, point 54 is defined by the use of a typical asymmetric thread 52 that has a tip width 56 whose length is 4-7% of the screw axial pitch 38 (FIG. 2). The radius 53 of portion 42b should be 0.190 to 0.205, preferably 0.190, times the axial pitch 38.

The portion 44b of the trailing face 44 of thread profile 28' has a radius 62 that is constructed in association with point 54 of the asymmetric thread 52 and the aforesaid transition location 47 that is approximately 50% of the thread depth below the outer periphery of that thread. The length of the radius 62 is preferably in the range 75-125% of the axial pitch 38; most preferably, it is substantially equal to that pitch.

The fifth zone or portion 46 of profile 28' completes the thread tip 48 and, as noted above, blends together the leading and trailing thread profile face portions 42b and 44b. Preferably, portion 46 has a radius 63 that is approximately half the width 56 of the asymmetric thread 52 and 2.5-3.5% of the axial pitch 38 of the thread.

It can be seen from a comparison of the thread profiles 28' and 52 that the more typical profile 52 will provide for more initial nut anchor material displacement than will the profile 28' of fastener 20. Indeed, it is apparent from FIG. 3 that the initial resultant force of the thread profile 52 will require a relatively high initial tapping torque due to the need to displace more nut material. The force diagrams in FIG. 3A show that there will be created a radial force 66a and an axial force 66b, which are the component forces derived from the high initial resultant force 66. The radial force 66a is the force which produces the main cause of hoop stress cracking of the pliable material of a typical nut anchor.

In the present thread profile 28', the portion 42b with radius 53 defined above is constructed so that it reduces in outer periphery size and from the screw nominal outer diameter 34 (FIG. 2) toward the screw lead entry point which is in the direction of arrow A. That radius terminates at the point 43 where it joins the leading concave radius 41 of portion 42a at the common tangent line T. Preferably, that line T lies at an angle $\delta_1$ of 73°-78°, preferably 75°, relative to the core 24.

It can be seen from the force diagrams in FIGS. 3 and 3A that the resultant force 80 produced by portion 42b of the thread profile 28' is diminished below that provided by the prior asymmetric profile 52, and consequently, so does the radial component 80a and the axial component 80b of that resultant force. When more anchor material is displaced during the assembly of the fastener 20, it follows that higher loads will be required to create that displacement. These changes are shown by way of an additional force vector diagram in FIG. 3 where the resultant force 82 is reduced to a radial component force 82a and an axial component force 82b. By employing the radius 53 in the fastener profile 28', the smooth flow of material becomes evident and the increase in the radial force 82a does not increase at the same rate as would be the case if a straight line, angled forward tip face were to be used as in FIG. 1. This reduction in the total hoop stress produced by fastener 20 results in improvements in the screw/nut anchor assembly joint integrity.

The aforesaid benefits achieved throughout zone or portion 42b of the leading face 42 are achieved until zone 42b transitions to the concave frontal zone 42a at point 43 where the common tangent line T is angled relative to the core 24 in a manner that increases the thread profile width as the tangent line moves inward toward the root of the thread at the core.

Still referring to FIG. 3, the trailing face 44 of the thread profile 28' is constructed using the aforesaid radius 62. That radius is such as to increase the surface area of the fourth zone or portion 44b beyond that of the usual straight trailing face 5 of thread profile 2 depicted in FIG. 1. This results in less material stress being developed when the fastener is tightened into the nut anchor N (FIG. 4) under a tensile load 92b, with a radial force component 92a that diminishes the closer that the screw/nut anchor contact faces are to the fastener core 26. A secondary consideration is that of directing the resultant force 92 in a direction that is perpendicular to the tangent of the radius 62 to provide a more even stress distribution within the nut anchor material. The radial force component 92a minimizes the tendency for nut anchor material bursting when the fastener 20 is subjected to an axial withdrawal force in the direction of arrow A.

The radius 62 of the trailing face profile portion 44b is constructed in the manner that increases the thread "fatness" as well as the magnitude of the anchor material displacement to compensate for the reduced displacement created by the above described blended radii of the portions 42b, 44b and 46 at tip 48, as compared to the tip of the conventional asymmetric thread profile 52. Preferably, the radius 62 of the trailing face portion 44b is constructed using the identical point 54 that is used for the construction of the radius 53 of the leading face portion 42b. As noted above, this radius terminates at transition location 47 which should be 0.5 to 0.7, preferably 0.5 times, of the total height 36 of the thread profile 28'. The trailing face 44 then continues to the core 26 as a linear extension or tangent of the radius profile. To extend the convex zone 44b of the trailing face closer to core 24 does not provide any additional measurable advantages in load carrying capability.

However, should the trailing face zone or portion 44b be extended down to core 24 as shown in phantom at 44b' in FIG. 3, that extension should intersect core 26 at an axial position therealong which intersects the root of an asymmetric thread 52 lying at an angle 62 of 77.5° to 82°, preferably 80°, relative to the longitudinal axis of the core. This control provides for limits in material displacement during the application of the fastener as well as a screw thread construction that will maintain control of the above-mentioned vector forces in accordance with the objectives of the invention.

As noted above, the radius 63 of the fifth zone or portion 46 is a blending radius to ensure a smooth transition between the leading tip radius 53 and the trailing tip radius 62. The magnitude of the blending radius 63 is in the range of 0.025-0.035, preferably 0.030, times the axial pitch 38 (FIG. 2). The stated blending radius 63 minimizes the potential for detrimental "stress raisers" to be generated in the nut anchor material during the thread tapping operation or when the assembly is subjected to external withdrawal forces.

Refer now to FIG. 4, which shows a fastener shank 100 threaded into a nut anchor N. The shank comprises a core 102 and a twin lead thread 104 comprising a first profile 104a and a second, intermediate, profile 104b on the core. The thread lead 106 of thread 104 is twice that of the thread pitch 108. Preferably, the diameter of the intermediate thread profile 104b is reduced from that of the nominal screw thread diameter by an amount 110. The purpose of this reduction is to take full advantage of the high helix angle developed by the use of a two-start thread in that the shear area between the adjacent peaks of thread profile 104a is maximized. The magnitude of the reduction 110 should be in the range of 15-20% of the total thread height 36 (FIG. 2).

Reducing the intermediate thread profile 104b below this amount will not allow the benefit of the force couples to create the best possible nut anchor material movement toward the loaded faces of the assembled nut/anchor threads. Also, using a single start thread of a pitch equivalent to the lead of a twin lead thread, although providing for a similar increase in the thread helix angle in the corresponding stress area of the nut anchor, will not allow for the benefit of the nut anchor material flow that is generated by the present invention.

It will be seen from the foregoing that thread forming fasteners and assembly utilizing my invention will benefit from the fasteners being able to create, together with the nut anchor, the ability to withstand higher axial withdrawal forces than can be achieved in a conventional fastener assembly system.

It will also be seen that the objects set forth above among those made apparent from the preceding description are efficiently attained. Also, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein.

The invention claimed is:

1. A thread forming fastener comprising a drive head (22) and a shank (24) extending from the drive head, said shank including a core (26) and a helical thread (28) formed on the core, said thread (28) having a tip (8), a selected thread height (36), a selected axial pitch (38) and a profile which in axial cross-section is non-symmetrical and includes a radially inner concave leading face portion (42a) with a first radius (41) and which transitions smoothly to a radially outer convex leading face portion (42b) with a second radius (53) shorter than the first radius (41) at a transition location (43) spaced a distance from said tip (8) equal to 22-27% of said selected thread height (36), a blending portion (46) at said tip with a third radius (63) shorter than said second radius (53), said blending portion having a first end which blends smoothly with said radially outer convex leading face portion (42b) and a second end which blends smoothly with an outer end of a convex outer portion (44b) of trailing face (44) and whose radius (62) is longer than said first radius (41), said trailing face (44) extending inward to said core (26).

2. The fastener defined in claim 1 wherein the length of the second radius (53) is 0.190-0.205 times the axial pitch (38), the convex outer portion radius (62) is 0.75 to 1.25 times the axial pitch (38), and the third radius (63) is 0.025-0.035 times the axial pitch.

3. The fastener defined in claim 1 wherein said thread (28) has a selected outer diameter (34), and the length of said first radius (41) is 0.27-0.33 times said selected outer diameter.

4. A thread forming fastener for threading into a nut anchor of a pliable material, said fastener comprising a drive head (22) and a shank (24) extending from said head and having a longitudinal axis, said shank having a selected diameter (34) and including a core (26) and a helical thread (28) formed on the core, said thread having a selected axial pitch (38), a selected thread height (36) and a profile which in axial cross-section is non-symmetrical and includes a leading face (42), a trailing face (44) and a tip (8), said leading face being composed of a radially inner concave portion (42a) having a first radius (41) extending from said core (26) to a transition point (43) on a common tangent line (T) with a radially outer convex leading face portion (42b) having a second radius (53) shorter than the first radius (41), said transition point (43)

being at a distance from said tip (8) equal to 22-27% of said selected thread height (36), said profile also including at said tip (8) a radially outer convex blending portion (46) having a third radius (63) shorter than the second radius (53) and which at one end blends smoothly with said radially outer convex leading face portion (42*b*) and at another end blends smoothly with an outer end of a convex trailing face portion (44*b*) of the trailing face (44), said portion (44*b*) having a fourth radius (62) longer than the first radius (41) and which extends from said blending portion (46) to a location (47) at which a tangent to the trailing face portion (44*b*) has an angle of at least 77.5° with respect to said axis, said trailing face (44) extending inward to said core (26).

5. The fastener defined in claim 4 wherein said second radius (53) is 0.190 to 0.205 times said axial pitch.

6. The fastener defined in claim 4 wherein said tangent line (T) defines with said core (26) an included angle ($\delta_1$) of 73°-78° and said first radius (41) is 0.22 to 0.30 times said selected diameter (34).

7. The fastener defined in claim 4 wherein the length of said third radius (63) is 0.025 to 0.035 times said axial pitch (38).

8. The fastener defined in claim 7 wherein the convex trailing face portion (44*b*) extends to said core (26).

9. The fastener defined in claim 7 wherein the convex trailing face portion 44*b* has a radius (62) of 0.75 to 1.25 times said axial pitch (38).

10. The fastener defined in claim 9 wherein the convex trailing face portion radius (62) substantially equals said axial pitch (38).

11. The fastener defined in claim 4 wherein the trailing face tangent location (47) is at a distance from the core (26) of 0.5 to 0.7 times said thread height (36).

12. The fastener defined in claim 11 wherein the trailing face tangent location (42) is at a distance from the core (26) of substantially one-half the thread height (36).

13. The fastener defined in claim 4 wherein said fastener has an intermediate thread (104*b*) interleaved with said thread (104*a*).

14. The fastener defined in claim 13 wherein the height from the core (26) of the intermediate thread (104*b*) has a reduced height as compared to that of said thread (104*a*).

15. The fastener defined in claim 14 wherein the height of the intermediate thread (104*b*) is 80% to 85% of said thread height.

* * * * *